(12) United States Patent
Lee et al.

(10) Patent No.: US 11,236,855 B1
(45) Date of Patent: Feb. 1, 2022

(54) DISPLAY APPARATUS

(71) Applicant: LG ELECTRONICS INC., Seoul (KR)

(72) Inventors: Jaehun Lee, Seoul (KR); Kangyeung Lee, Seoul (KR); Byunghee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/025,910

(22) Filed: Sep. 18, 2020

(30) Foreign Application Priority Data

Jul. 7, 2020 (KR) .......................... 10-2020-0083722

(51) Int. Cl.
*F16M 11/12* (2006.01)
*F16M 11/28* (2006.01)
(Continued)

(52) U.S. Cl.
CPC ........... *F16M 11/12* (2013.01); *F16M 11/105* (2013.01); *F16M 11/18* (2013.01); *F16M 11/28* (2013.01)

(58) Field of Classification Search
CPC ...... F16M 11/12; F16M 11/105; F16M 11/18; F16M 11/28; F16M 11/2028; F16M 11/045; F16M 11/043; F16M 11/425; F16M 11/24; F16M 11/42; F16M 11/2085; F16M 11/046; F16M 2200/042; F16M 2200/047; G06F 1/1601; G06F 2200/1612; F16H 19/001; F16H 19/04; F16F 15/129

See application file for complete search history.

(56) References Cited

U.S. PATENT DOCUMENTS 7,815,154 B2 10/2010 Oh et al.
2007/0262210 A1 11/2007 Oh et al.
(Continued)

FOREIGN PATENT DOCUMENTS

JP 09171355 6/1997
JP 2019197120 A * 11/2019
KR 20070109009 11/2007

OTHER PUBLICATIONS

European Patent Office Application Serial No. 20199614.7, Search Report dated Mar. 24, 2021, 5 pages.

*Primary Examiner* — Eret C McNichols
*Assistant Examiner* — Ding Y Tan
(74) *Attorney, Agent, or Firm* — Lee, Hong, Degerman, Kang & Waimey PC

(57) ABSTRACT

A display apparatus includes a base, a stand vertically extending upward from the base, a head having a display provided on a front surface thereof and pivotable between a landscape mode and a portrait mode, a penetration groove extending along the circumference of the head, a connecting bar connected to the stand and extending to an inside of the head through the penetration groove, an inner plate fixed to the inside of the head, a first guide groove formed in the inner plate and extending along a predetermined curved trajectory, a first guide pin protruding from the connecting bar and inserted into the first guide groove, a second guide groove formed in the connecting bar and extending in a longitudinal direction of the connecting bar, and a second guide pin fixed to the inside of the head or protruding from the inner plate and inserted into the second guide groove.

18 Claims, 17 Drawing Sheets

(51) Int. Cl.
*F16M 11/18* (2006.01)
*F16M 11/10* (2006.01)

(56) References Cited

U.S. PATENT DOCUMENTS

| | | | |
|---|---|---|---|
| 2009/0183341 A1* | 7/2009 | Chuan | H04M 1/0237 |
| | | | 16/358 |
| 2016/0305600 A1* | 10/2016 | Bowman | F16M 11/2021 |
| 2018/0094768 A1* | 4/2018 | Burke | F16M 11/2014 |
| 2018/0356027 A1* | 12/2018 | Kim | F16M 11/2028 |
| 2019/0316729 A1* | 10/2019 | Gurr | F16M 11/18 |
| 2019/0317549 A1* | 10/2019 | Gurr | F16M 11/046 |
| 2021/0004046 A1* | 1/2021 | Park | H05K 5/0204 |

\* cited by examiner

DISPLAY APPARATUS

CROSS-REFERENCE TO RELATED APPLICATIONS

Pursuant to 35 U.S.C. § 119(a), this application claims the benefit of earlier filing date and right of priority to Korean Patent Application No. 10-2020-0083722, filed on Jul. 7, 2020, the contents of which are all hereby incorporated by reference herein in its entirety.

BACKGROUND

The present disclosure relates to a display apparatus.

A display apparatus displays image information received from the outside or image information stored therein. Representative examples of the display apparatus include a television, a monitor, a laptop, a smartphone, etc.

However, conventional mobile display apparatuses such as smartphones have limited sizes for portability. On the contrary, relatively large display apparatuses such as TVs require a wide installation space and have inconvenient mobility.

RELATED ART

Patent Document

KR 10-2007-0109009A (published on Nov. 15, 2007)

SUMMARY

The present disclosure is devised to solve the above-described problems and an object of the present disclosure is to provide a display apparatus in which a head is pivotable between a landscape mode and a portrait mode by applying a simple structure.

Another object of the present disclosure is to provide a compact display apparatus having a beautiful design.

A display apparatus according to an embodiment of the present disclosure includes a pair of guide grooves extending along different trajectories and a pair of guide pins inserted into the pair of guide grooves.

More specifically, a display apparatus according to an embodiment of the present disclosure includes a base, a stand vertically extending upward from the base, a head having a display provided on a front surface thereof and pivotable between a landscape mode in which a long side of a circumference is in a horizontal state and a portrait mode in which the long side is in a vertical state, a penetration groove extending along the circumference of the head, a connecting bar connected to the stand and extending to an inside of the head through the penetration groove, an inner plate fixed to the inside of the head, a first guide groove formed in the inner plate and extending along a predetermined curved trajectory, a first guide pin protruding from the connecting bar and inserted into the first guide groove, a second guide groove formed in the connecting bar and extending in a longitudinal direction of the connecting bar, and a second guide pin fixed to the inside of the head or protruding from the inner plate and inserted into the second guide groove.

The first guide pin may be located between the second guide groove and the penetration groove in the longitudinal direction of the connecting bar.

The connecting bar may be horizontally maintained at the time of pivot of the head.

At the time of pivot of the head, the inner plate may slide with respect to the first guide pin along a trajectory of the first guide groove, and the second guide pin may slide along the second guide groove.

A distance between the first guide groove and the penetration groove may vary in a longitudinal direction of the first guide groove.

A distance between the first guide groove and the penetration groove in the longitudinal direction of the connecting bar may be the same when the head is in the landscape mode and the portrait mode.

The penetration groove may include a first groove extending along a short side of the circumference of the head, and a second groove extending along a long side of the circumference of the head and connected with the first groove.

The first guide groove may include a first section between a first point where the first guide pin is located when the head is in the landscape mode and a second point where the first guide pin is located when the connecting bar passes between the first groove and the second groove, and a second section between a third point where the first guide pin is located when the head is in the portrait mode and the second point. One of the pair of guide pins may be inserted into the first guide groove, and the other of the pair of guide pins may be inserted into the second guide groove.

The first section may include a first decreasing section in which a distance from the first groove decreases and a first increasing section in which the distance from the first groove increases, from the first point to the second point, and the second section may include a second decreasing section in which a distance from the second groove decreases and a second increasing section in which the distance from the second groove increases, from the second point to the third point.

The inner plate may include a plate body having a metal material and having a penetration portion formed therein, and a guide body fastened to the penetration portion, having the first guide groove formed therein, and having a non-metallic material.

The connecting bar may include a bar body having a metal material and having a long hole formed therein, and a guide body fastened to the long hole, having the second guide groove formed therein, and having a non-metallic material.

The guide body may have a polyoxymethylene material.

At least one of the first guide pin or the second guide pin may have a polyoxymethylene material.

The display apparatus may further include an electric wire extending from an inside of the base to the inside of the head through an inside of the stand. A passage for guiding the electric wire to the inside of the head may be formed in the connecting bar.

The first guide pin may be located between the second guide groove and the passage in the longitudinal direction of the connecting bar.

A display apparatus according to another embodiment of the present disclosure includes a base, a stand vertically extending upward from the base, a head having a display provided on a front surface thereof and pivotable between a landscape mode in which a long side of a circumference is in a horizontal state and a portrait mode in which the long side is in a vertical state, a penetration groove extending along the circumference of the head, a connecting bar connected to the stand and extending to an inside of the head through the penetration groove, an inner bracket fixed to the inside of the head, a pair of guide pins protruding from the inner bracket and spaced part from each other, a bracket guide fastened to an end of the connecting bar, a first guide groove formed in the bracket guide and extending horizontally, and a second guide groove formed in the bracket guide and extending along a curved trajectory longer than the first guide groove.

The pair of guide pins may be spaced apart from each other in a vertical direction when the head is in the landscape mode and may be spaced apart from each other in a horizontal direction when the head is in the portrait mode.

An inner end of the first guide groove and an inner end of the second guide groove may be spaced apart in a vertical direction, and an outer end of the first guide groove and an outer end of the second guide groove may be spaced apart in a horizontal direction.

A vertical distance between the inner end of the first guide groove and the inner end of the second guide groove may be equal to a horizontal distance between the outer end of the first guide groove and the outer end of the second guide groove.

DETAILED DESCRIPTION OF THE EMBODIMENTS

Hereinafter, specific embodiments of the present disclosure will be described in detail with reference to the drawings.

In the following, when one element is described as being "fastened" or "connected", this may mean that two elements are directly fastened or connected or mean a third element is interposed between two elements and the two elements are connected or fastened by the third element. In contrast, one element being "directly fastened" or "directly connected" to another element may mean that a third element is not interposed between the two elements.

Figure 1:
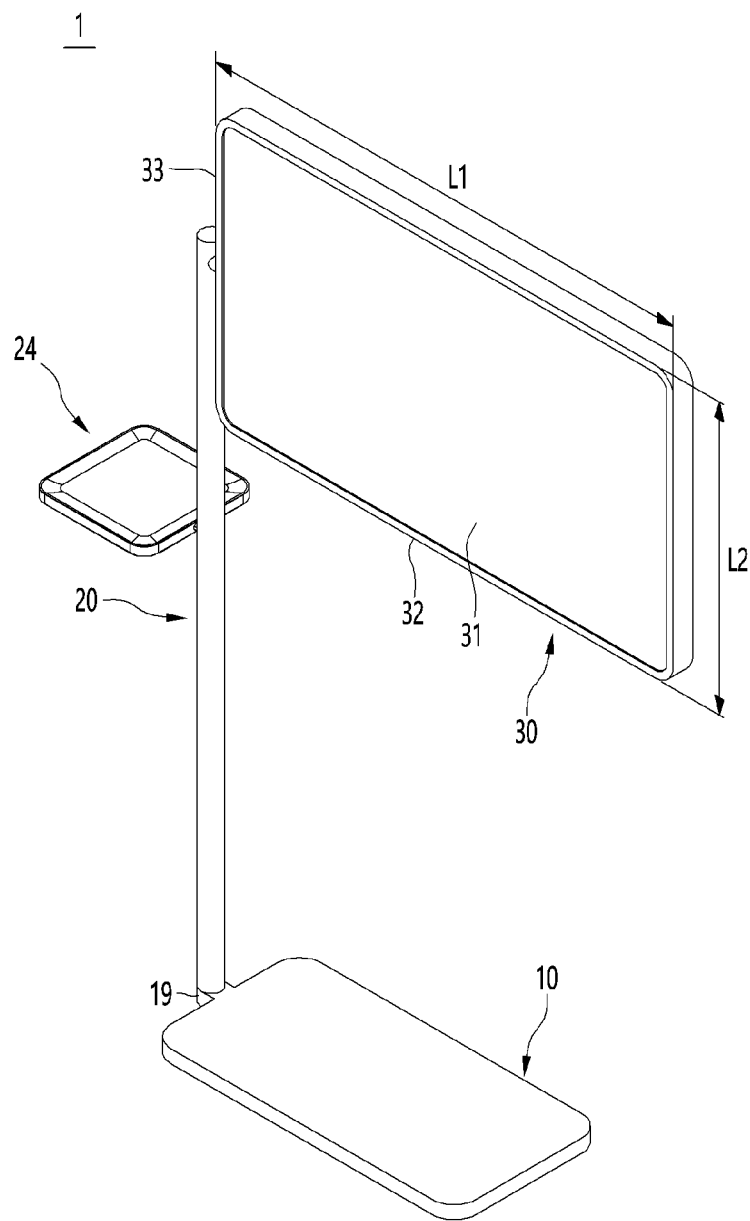
FIG. 1 is a perspective view of a display apparatus according to an embodiment of the present disclosure.
Figure 2:
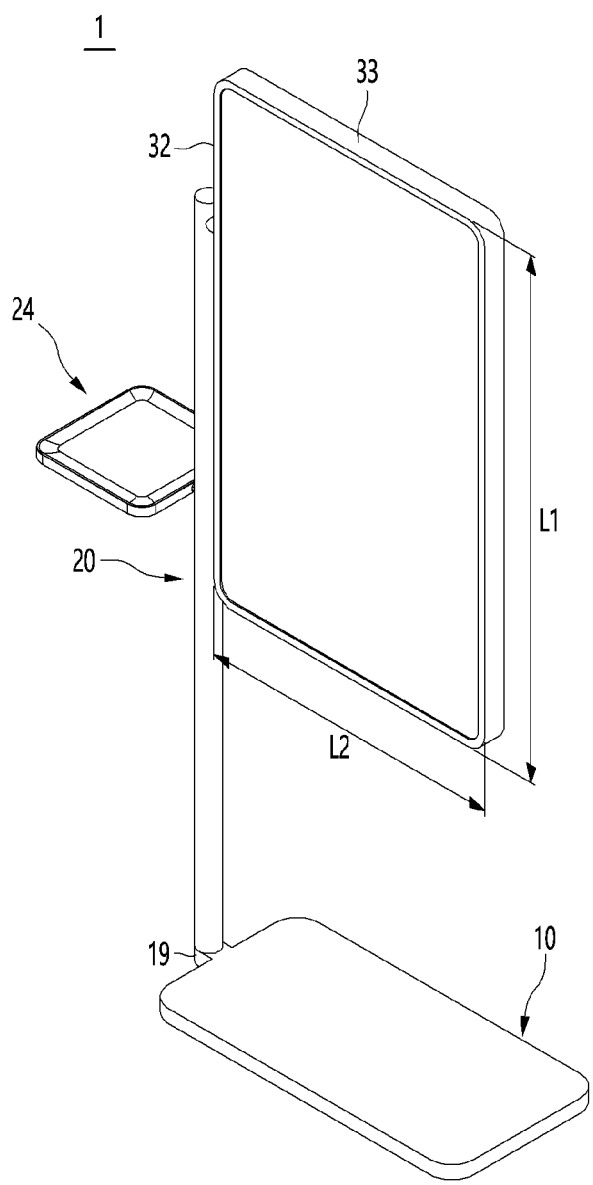
FIG. 2 is a perspective view showing a state in which a header shown in FIG. 1 is pivoted in a portrait mode.
Figure 3:
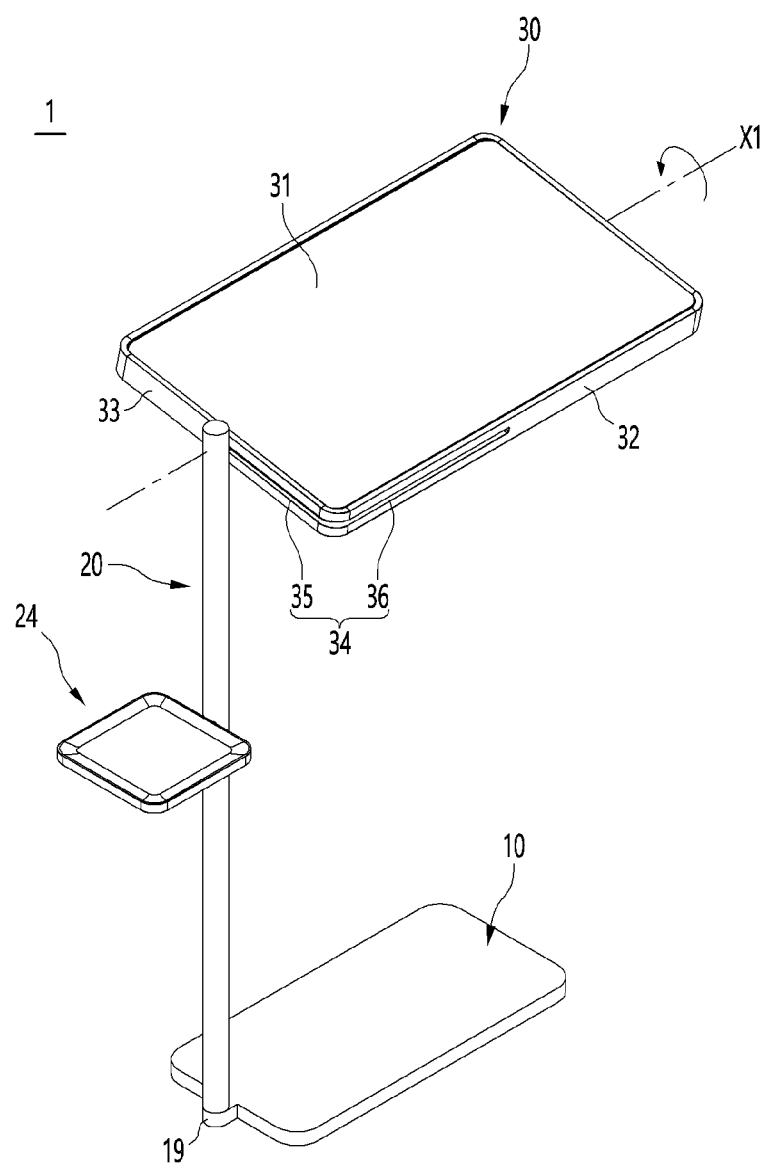
FIG. 3 is a view showing a state in which a head according to an embodiment of the present disclosure is tilted.
Figure 4:
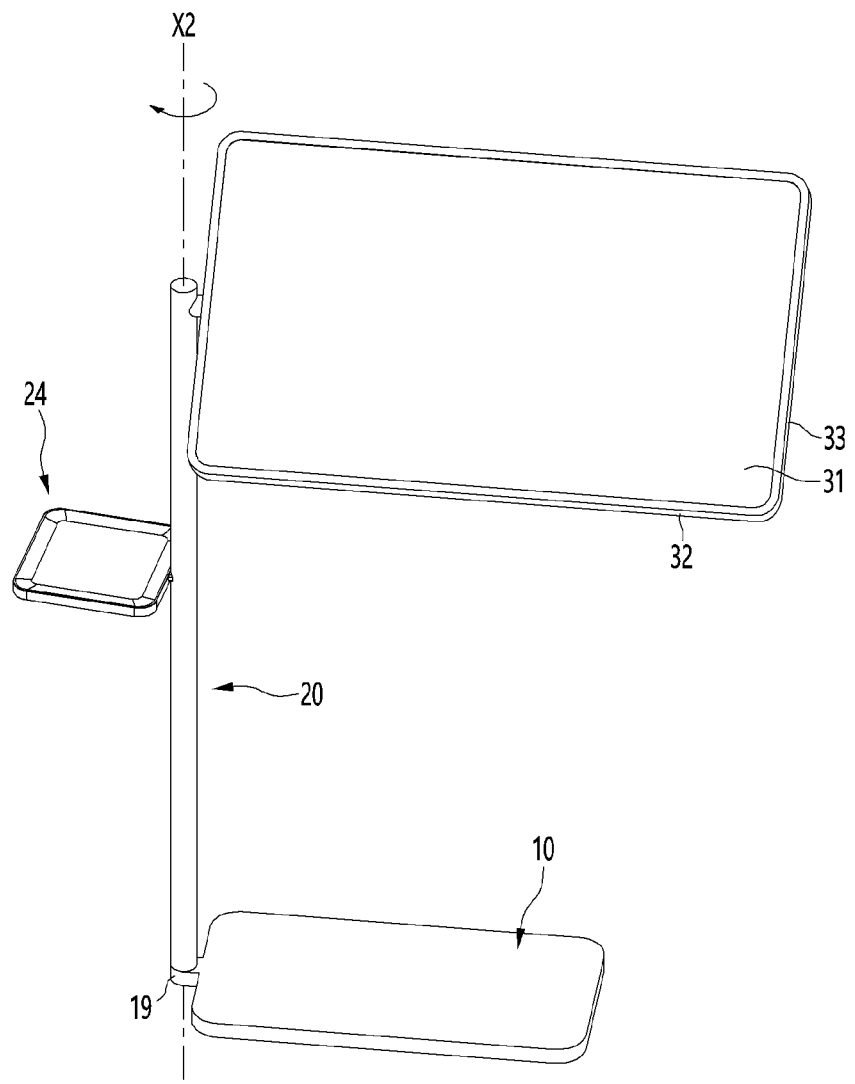
FIG. 4 is a view showing a state in which a head according to an embodiment of the present disclosure is swiveled.

FIG. 1 is a perspective view of a display apparatus according to an embodiment of the present disclosure, FIG. 2 is a perspective view showing a state in which a header shown in FIG. 1 is pivoted in a portrait mode, FIG. 3 is a view showing a state in which a head according to an embodiment of the present disclosure is tilted, and FIG. 4 is a view showing a state in which a head according to an embodiment of the present disclosure is swiveled.

The display apparatus 1 according to the embodiment of the present disclosure may include a base 10, a stand 20 and a head 30.

The base 10 may support the display apparatus 1 against a floor.

The stand 20 may vertically extend upward from the base 10. The stand 20 may connect the base 10 with the head 30. The stand 20 may have, but is not limited to, a vertical bar shape.

More specifically, the lower end of the stand 20 may be connected to the circumference of the base 10. A stand connector 19 protruding outward may be formed on the circumference of the base 10, and the lower end of the stand 20 may be connected to the stand connector 19.

The head 30 may be spaced apart upward from the base 10. A display 31 may be provided on the front surface of the head 30. An image or video may be displayed on the display 31. In addition, the display 31 may include a touchscreen.

Circumferences 32 and 33 of the head 30 may include a pair of long sides 32 and a pair of short sides 33. The longitudinal direction of the long side 32 and the longitudinal direction of the short side 33 may be perpendicular to each other. The length L1 of the long side 32 may be greater than the length L2 of the short side 33.

The head 30 may be pivoted between a landscape mode in which the long sides 32 are horizontal and the short sides 33 are vertical (see FIG. 1) and a portrait mode in which the long sides 32 are vertical and the short sides 33 are horizontal (see FIG. 2).

The head 30 may be located on the same side as the base 10 with respect to the stand 20. That is, the head 30 may overlap the base 10 in the vertical direction. Accordingly, since the center of gravity of the display apparatus 1 does not deviate from the upper side of the base 10, the display apparatus 1 may be stably supported without being overturned.

The left-and-right length of the base 10 may be less than the length L1 of the long side 32 of the head 30 and greater than the length L2 of the short side 33. Accordingly, in the landscape mode, the head 30 may laterally protrude from the base 10. The base 10 may laterally protrude from the head 30 in the portrait mode.

The stand 20 may extend to be sufficiently long. The height of the stand 20 may be greater than the length L1 of the long side 32 of the head 30. The height of the stand 20 may be greater than the sum L1+L2 of the length L1 of the long side 32 of the head 30 and the length L2 of the short side.

The stand 20 may be connected to the circumferences 32 and 33 of the head 30. More specifically, the upper portion of the stand 20 may be connected to the circumferences 32 and 33 of the head 30.

Since the stand 20 is connected to the circumferences 32 and 33 rather than the rear surface of the head 30, the design of the appearance of the display apparatus 1 may be improved, and the rear surface of the head 30 may be used for another purpose. For example, a mirror and a backlight may be provided on the rear surface of the head 30.

The upper portion of the stand 20 may face the circumferences 32 and 33 of the head 30 in the horizontal direction. More specifically, in the landscape mode, the upper portion of the stand 20 may face the short sides 33 of the head 30 in the horizontal direction. In the portrait mode, the upper portion of the stand 20 may face the long sides 32 of the head 30 in the horizontal direction.

A penetration groove 34 may be formed in the circumferences 32 and 33 of the head 30. The penetration groove 34 may extend along the circumferences 32 and 33 of the head 30. The head 30 may be connected to the stand 20 through the penetration groove 34.

More specifically, a connecting bar 50 (see FIG. 6) protruding toward the penetration groove 34 may be formed on the stand 20. The connecting bar 50 may extend to the inside of the head 30 through the penetration groove 34.

The penetration groove 34 may include a first groove 35 formed in the short side 33 and a second groove 36 formed in the long side 32. The first groove 35 may extend along the short side 33 and the second groove 36 may extend along the long side 32. The first groove 35 may be connected to the second groove 36. The first groove 35 may be connected to the second groove 36 at a corner of the circumferences 32 and 33.

The first groove 35 may be formed in any one of the pair of short sides 33. The length of the first groove 35 may be less than that of the short side 33 and may be greater to or equal to half the length of the short side 33.

The second groove 36 may be formed in any one of the pair of long sides 32. The length of the second groove 36 may be less than that of the long side and may be greater to or equal to half the length of the long side 32.

Accordingly, at the time of pivot of the head 30, the connecting bar 50 (see FIG. 6) may be maintained in a state of passing through the penetration groove 34. In the landscape mode, the connecting bar 50 may extend to the inside of the head 30 through the first groove 35. In the portrait mode, the connecting bar 50 may extend to the inside of the head 30 through the second groove 36.

The stand 20 may include a cradle 24. The cradle 24 may be horizontally disposed. A terminal such as a smartphone may be mounted on the cradle 24. The display apparatus 1 may be configured to perform charging of the terminal mounted on the cradle 24. In addition, the display apparatus 1 may be configured to selectively mirror the screen of the terminal mounted on the cradle 24 to the display 31 of the head 30.

The cradle 24 may be located at a lower height than the head 30. More specifically, a vertical distance from the base 10 to the cradle 24 may be less than a vertical distance from the base 10 to the head 30.

In addition, the head 30 and the cradle 24 may located at opposite sides of the stand 20. More specifically, the head 30 may be located on one side of the stand 20 and the cradle 24 may be located on the other side of the stand 20.

Meanwhile, as shown in FIG. 3, the head 30 may rotate about a horizontal axis x1 with respect to the stand 20. The horizontal axis x1 may correspond to the connecting bar 50 (see FIG. 6). The connecting bar 50 may be rotatably connected to the stand 20, and the head 30 may rotate along with the connecting bar 50. That is, the head 30 may be tilted by a predetermined angle with respect to the horizontal axis x1.

The head 30 may be tilted regardless of pivot of the head 30. That is, the head 30 may be tilted in the landscape mode and may be tilted in the portrait mode.

In addition, the head may rotate (tilt) by up to 180 degrees. That is, the head 30 may rotate such that the display 31 faces backward and the rear surface of the head 30 faces forward.

Accordingly, when the mirror and the backlight are provided on the rear surface of the head 30, a user may utilize the display apparatus as a standing mirror or a light.

In addition, as shown in FIG. 4, the head 30 may rotate about a vertical axis x2 with respect to the base 10 along with the stand 20. More specifically, the lower end of the stand 20 may be rotatably connected to the stand connector 19 of the base 10. Accordingly, the head 30 may be swiveled by a predetermined angle with respect to the vertical axis x2.

The swivel motion of the head 30 may be performed regardless of pivot and tilt of the head 30. That is, the head 30 may be swiveled in the landscape mode, may be swiveled in the portrait mode, and may be swiveled in a state of being tilted by a predetermined angle.

Figure 5:
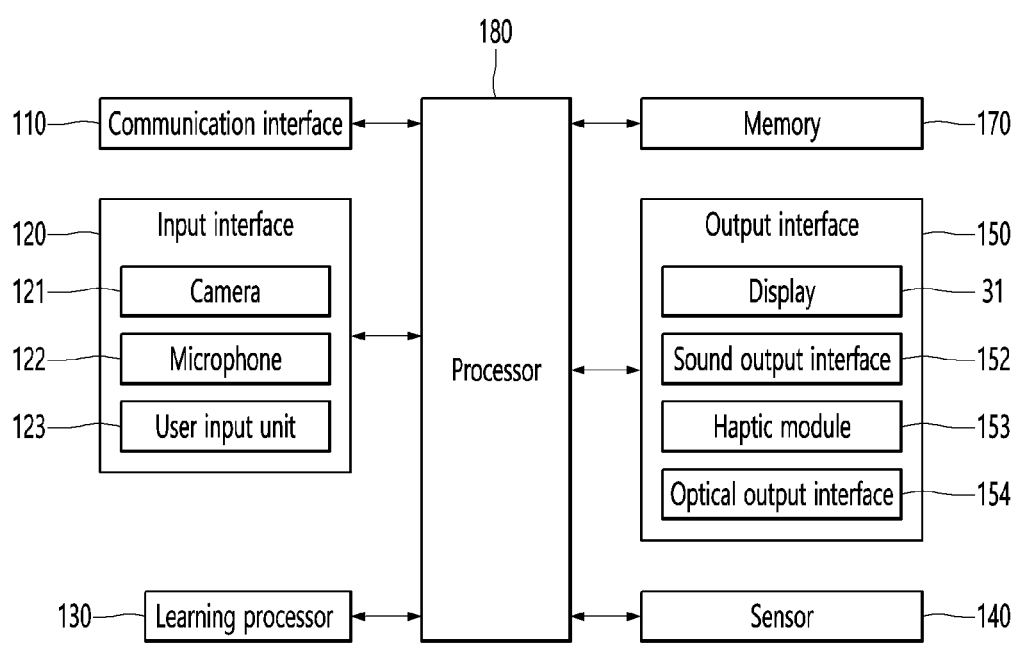
FIG. 5 is a block diagram illustrating components of a display apparatus according to an embodiment of the present disclosure.

FIG. 5 is a block diagram illustrating components of a display apparatus according to an embodiment of the present disclosure.

In particular, the components of FIG. 5 may be included in the base 10 or the head 30 of FIG. 1.

Referring to FIG. 5, the display apparatus 1 may include a communication interface 110, an input interface 120, a learning processor 130, a sensor 140, an output interface 150, a memory 170 and a processor 180.

The communication interface 110 may transmit and receive data to and from external devices such as another terminal or an external server using wired/wireless communication technology. For example, the communication interface 110 may transmit and receive sensor information, user input, learning models, control signals, etc. to and from the external devices.

At this time, communication technologies used by the communication interface 110 may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), etc.

The input interface 120 may acquire various types of data.

At this time, the input interface 120 may include a camera for receiving an image signal, a microphone for receiving an audio signal, a user input interface for receiving information from a user, etc. Here, the camera or the microphone may be treated as a sensor, and signals acquired from the camera or the microphone may be referred to as sensing data or sensor information.

The input interface 120 may acquire input data to be used when output is acquired using learning data and learning models for model learning. The input interface 120 may acquire raw input data and, in this case, the processor 180 or the learning processor 130 may extract input features as preprocessing of input data.

The input interface 120 may include a camera 121 for receiving an image signal, a microphone 122 for receiving an audio signal, and a user input unit 123 for receiving information from a user.

The voice data or image data collected by the input interface 120 may be analyzed and processed as control commands of the user.

The input interface 120 serves to receive image information (or signals), audio information (or signals), data or user input information, and, for input of the image information, the display apparatus 1 may include one or a plurality of cameras 121.

The camera 121 processes an image frame such as a still image or a moving image obtained by an image sensor in a video call mode or a capture mode. The processed image frame may be displayed on a display 31 or a memory 170.

The microphone 122 processes an external acoustic signal into electrical audio data. The processed audio data may be variously used according to the function (or application program) executed in the display apparatus 1. Meanwhile, the microphone 122 may include various noise removal algorithms to remove noise generated in the process of receiving the external sound signal.

The user input interface 123 receives information from the user, and, when information is received through the user input interface 123, the processor 180 may control operation of the display apparatus 1 to correspond to the received information.

The user input unit 123 may include one or more of a mechanical input element (for example, a mechanical key, a button located on a front and/or rear surface or a side surface of the terminal 1, a dome switch, a jog wheel, a jog switch, and the like) or a touch input element. As one example, the touch input element may be a virtual key, a soft key or a visual key, which is displayed on a touchscreen through software processing, or a touch key located on a location other than the touchscreen.

The learning processor 130 may train a model composed of an artificial neural network using learning data. Here, the trained artificial neural network may be referred to as a learning model. The learning model may be used to infer a result value with respect to new input data rather than learning data, and the inferred value may be used as a basis for determining certain operation.

At this time, the learning processor 130 may include a memory integrated with or implemented in the display apparatus 1. Alternatively, the learning processor 130 may be implemented using the memory 170, an external memory directly coupled to the display apparatus 1 or a memory maintained in an external device.

The sensor 140 may acquire at least one of internal information of the display apparatus 1, surrounding environment information of the display apparatus 1 or user information using various sensors.

At this time, the sensor included in the sensor 140 may include a proximity sensor, an illumination sensor, an acceleration sensor, a magnetic sensor, a gyroscope sensor, an inertia sensor, an RGB sensor, a finger scan sensor, an ultrasonic sensor, an optical sensor, a microphone, a Lidar, a radar, etc.

The output interface 150 may generate video, audio or tactile output.

At this time, the output interface 150 may include a display for outputting video information, a speaker for outputting audio information, and a haptic module for outputting tactile information, etc.

The output interface 150 may include at least one of a display 31, a sound output unit 152, a haptic module 153 or an optical output unit 154.

The display 31 displays (outputs) information processed in the display apparatus 1. For example, the display 31 may display execution screen information of an application program executed by the display apparatus 1 or user interface (UI) and graphical user interface (GUI) information according to the executed screen information.

The display 31 may have an inter-layered structure or an integrated structure with a touch sensor in order to realize a touchscreen. The touchscreen may function as the user input unit 123 which provides an input interface between the display apparatus 1 and the user and provide an output interface between the terminal 1 and a user.

The sound output interface 152 may output audio data received from the communication interface 110 or stored in the memory 170 in a call signal reception mode, a call mode, a record mode, a speech recognition mode, a broadcast reception mode, and the like.

The sound output interface 152 may also include a receiver, a speaker, a buzzer, or the like.

The haptic module 153 generates various tactile effects that a user feels. A typical example of a tactile effect generated by the haptic module 153 is vibration.

The optical output interface 154 may output a signal indicating event generation using light of a light source of the display apparatus 1. Examples of events generated in the display apparatus 1 may include message reception, call signal reception, a missed call, an alarm, a schedule notice, email reception, information reception through an application, and the like.

The memory 170 may store data supporting various functions of the display apparatus 1. For example, the memory 170 may store input data, learning data, a learning model, a learning history, etc. acquired in the input interface 120.

The processor 180 may determine at least one executable operation of the display apparatus 1 based on information determined or generated using a data analysis algorithm or a machine learning algorithm. In addition, the processor 180 may control the components of the display apparatus 1 to perform the determined operation.

To this end, the processor 180 may request, search for, receive or use the data of the learning processor 130 or the memory 170, and control the components of the display apparatus 1 to perform predicted operation or operation determined to be preferable among the at least one executable operation.

At this time, the processor 180 may generate a control signal for controlling an external device and transmit the generated control signal to the external device, when connection of the external device is necessary to perform the determined operation.

The processor 180 may acquire intention information with respect to user input and determine a request of the user based on the acquired intention information.

At this time, the processor 180 may acquire intention information corresponding to user input using at least one of a speech-to-text (STT) engine for converting voice input into a character string or a natural language processing (NLP) engine for acquiring intention information of a natural language.

At this time, at least one of the STT engine or the NLP engine may be composed of an artificial neural network learned according to a machine learning algorithm. In addition, at least one of the STT engine or the NLP engine may be learned by the learning processor 130, learned by an external learned server or learned by distribution processing thereof.

The processor 180 may collect history information including content on operation of the display apparatus 1 or the feedback of the user for the operation, store the history information in the memory 170 or the learning processor 130 or transmit the history information to an external device such as an external server. The collected history information may be used to update the learning model.

The processor 180 may control at least some of the components of the display apparatus 1, in order to drive an application program stored in the memory 170. Further, the processor 180 may operate by combining two or more of the components included in the display apparatus 1, in order to drive the application program.

Figure 6:
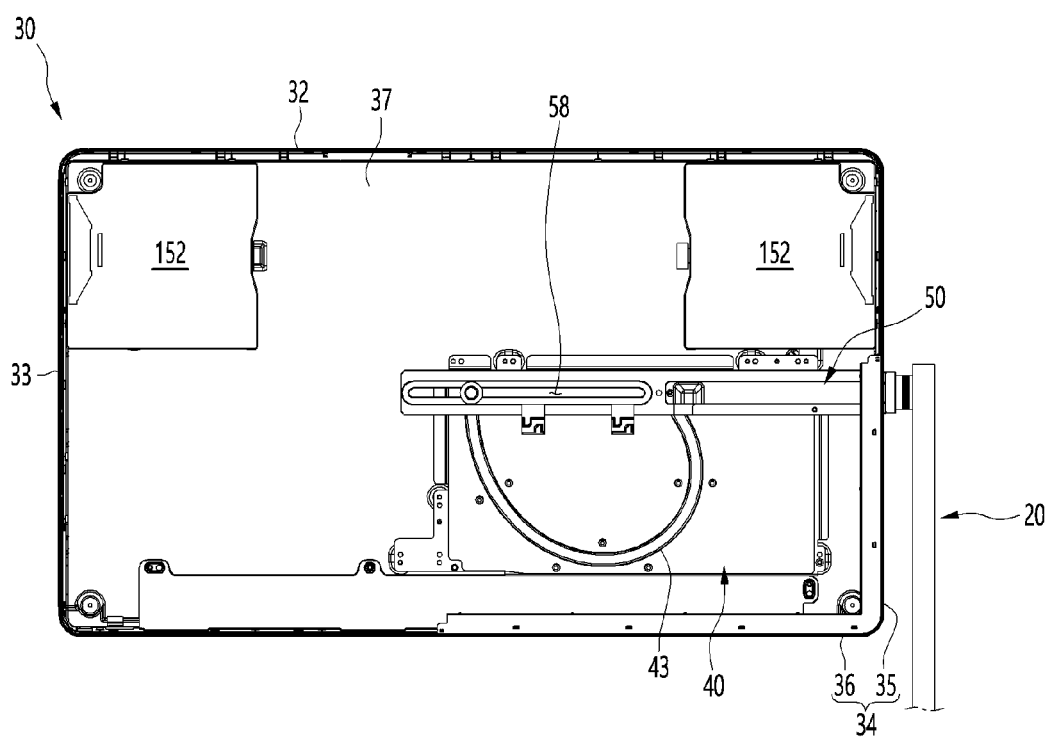
FIG. 6 is a view showing the inside of a head according to an embodiment of the present disclosure.
Figure 7:
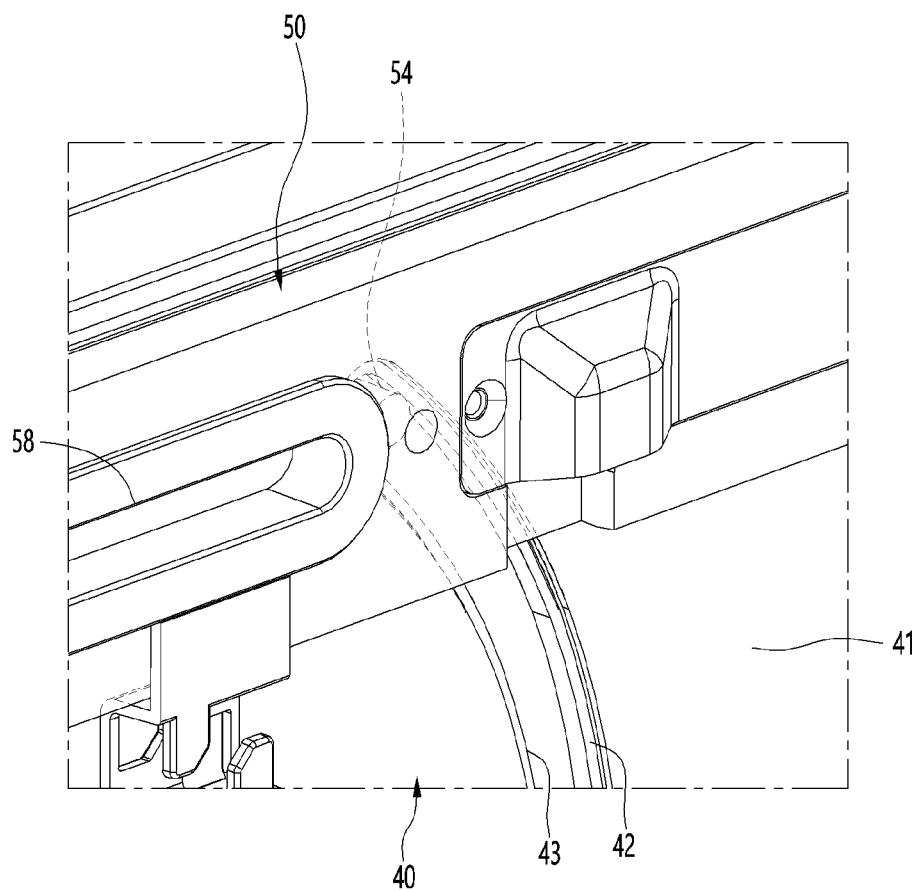
FIG. 7 is an enlarged view illustrating the periphery of a first guide pin according to an embodiment of the present disclosure.
Figure 8:
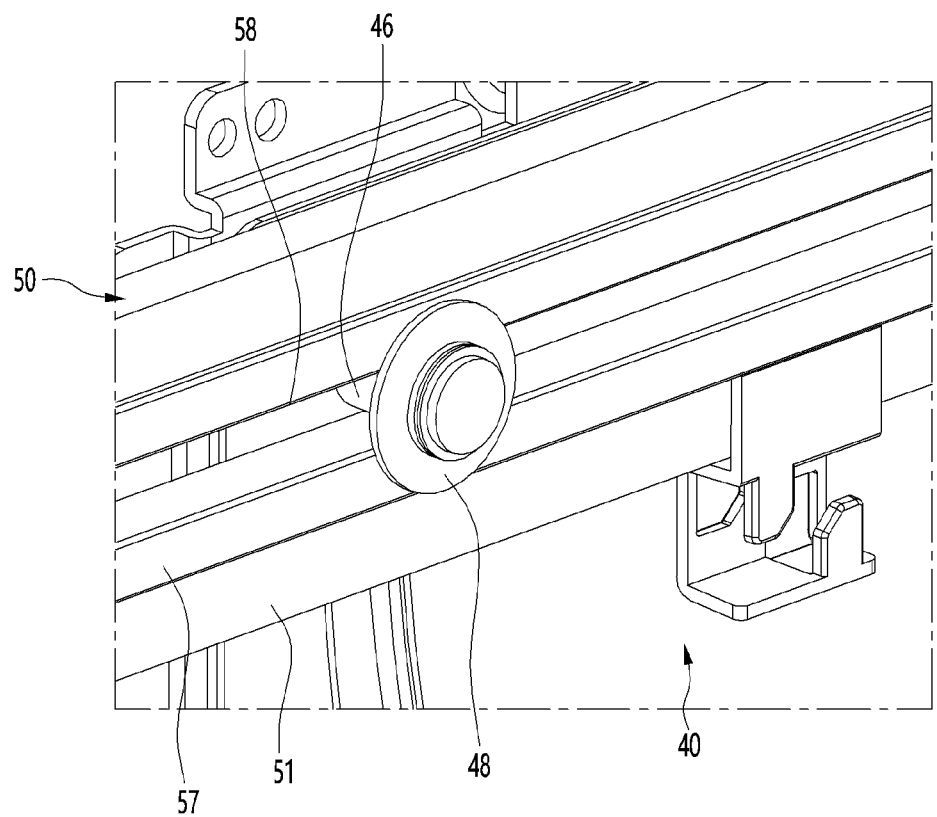
FIG. 8 is an enlarged view illustrating the periphery of a second guide pin according to an embodiment of the present disclosure.
Figure 9:
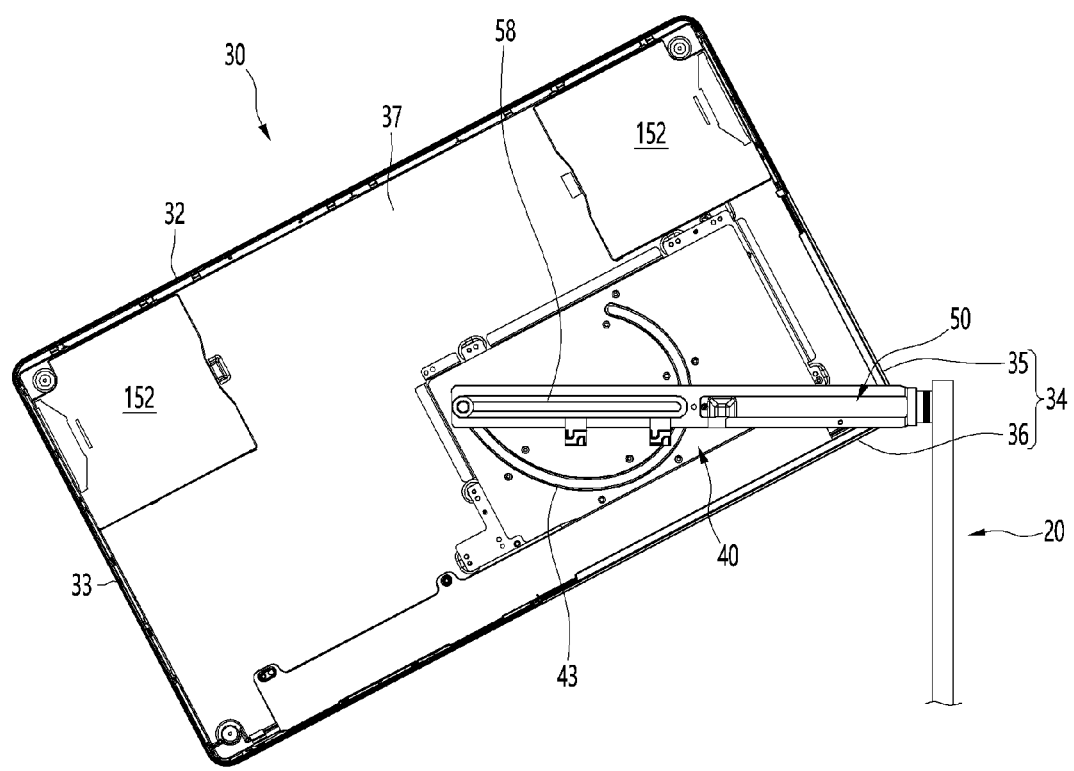
FIGS. 9 and 10 are views illustrating pivot motion of a head according to an embodiment of the present disclosure.
Figure 10:
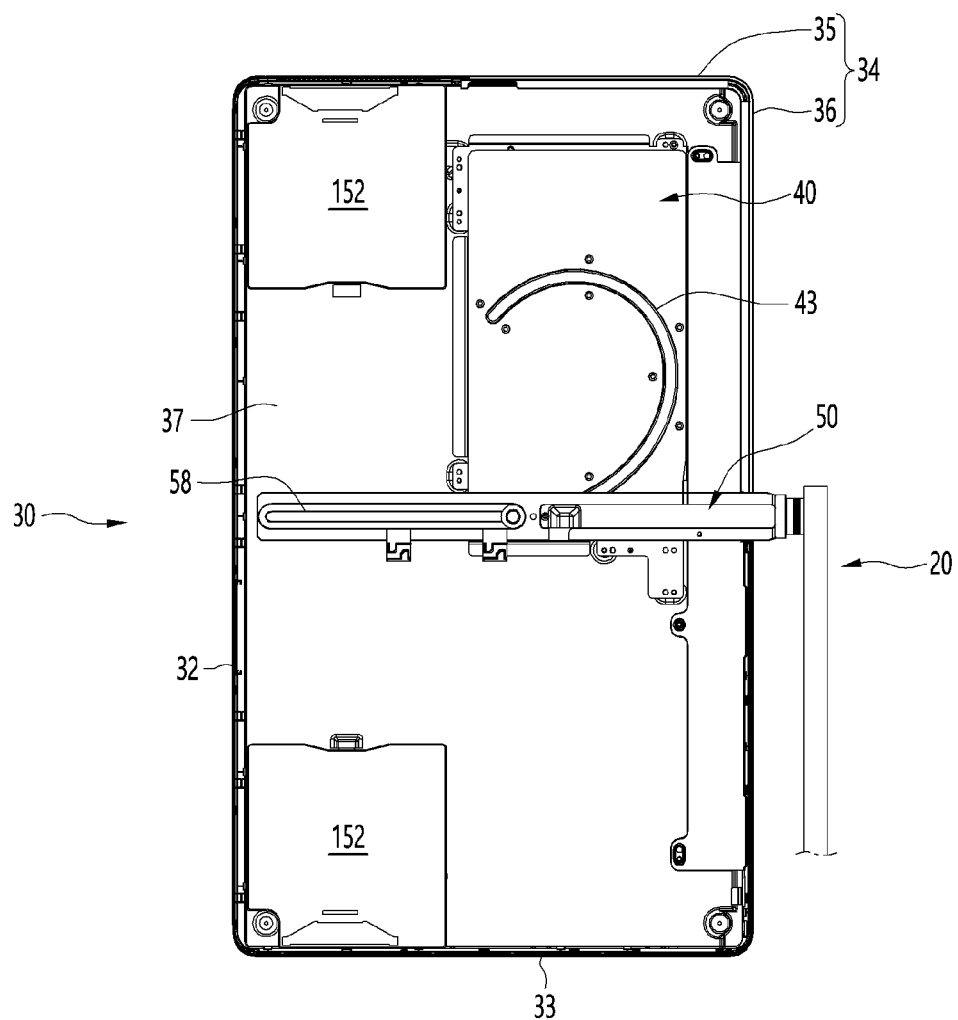

FIG. 6 is a view showing the inside of a head according to an embodiment of the present disclosure, FIG. 7 is an enlarged view illustrating the periphery of a first guide pin according to an embodiment of the present disclosure, FIG. 8 is an enlarged view illustrating the periphery of a second guide pin according to an embodiment of the present disclosure, and FIGS. 9 and 10 are views illustrating pivot motion of a head according to an embodiment of the present disclosure.

A mounting plate 37 may be disposed inside the head 30. A plurality of electric components may be mounted on the mounting plate 37. The electric components may include at least one of a communication interface 110, an input interface 120, a sensor 140 or a processor 180. In addition, the sound output unit 152 may be mounted on the mounting plate 37. The plurality of electric components and the sound output unit 152 may be disposed not to interfere with an inner plate 40 and the connecting bar 50.

The display apparatus may further include the inner plate 40 and the connecting bar 50.

The inner plate 40 may be disposed inside the head 30. The inner plate 40 may be parallel with the display 31. The inner plate 40 may be fixed to the inside of the head 30. For example, the inner plate 40 may be fixed to the mounting plate 37.

The inner plate 40 may be disposed at a position corresponding to the penetration groove 34 formed in the circumferences 31 and 32 of the head 30. For example, a first groove 35 may be formed in a lower portion of the right side of the head 30 and a second groove 36 may be formed in a right portion of a lower side of the head 30, based on the direction shown in FIG. 6. In this case, the inner plate 40 may be disposed adjacent to the lower right corner of the head 30.

A first guide groove 43 extending along a predetermined curved trajectory may be formed in the inner plate 40. The first guide groove 43 may be formed in the inner plate 40.

The first guide groove 43 may have both ends and may be formed along a curved trajectory toward the circumferences 32 and 33 of the head 30. That is, the first guide groove 43 may be formed along the curved trajectory toward the penetration groove 34.

The first guide groove 43 may guide the pivot route of the head 30. More specifically, a first guide pin 54 inserted into the first guide groove 43 may be protrude from the connecting bar 50. Accordingly, at the pivot of the head 30, the inner plate 40 may be slide with respect to the first guide pin 54 along the trajectory of the first guide groove 43.

A distance between the first guide groove 43 and the penetration groove 34 may vary in the longitudinal direction of the first guide groove 43. More specifically, when the head 30 is in a landscape mode, the horizontal distance between the first guide groove 43 and a first groove 35 may decrease downward and then increase. In addition, when the head 30 is in a landscape mode, the vertical distance between the first guide groove 43 and a second groove 36 may decrease and then increase toward the stand 20.

Meanwhile, the connecting bar 50 may connect the head 30 with the stand 20. More specifically, the connecting bar 50 may be connected to the stand 20, and may be connected to the inner plate 40 by extending to the inside of the head 30 through the penetration groove 34.

The connecting bar 50 may be horizontally maintained regardless of tilt, pivot and swivel motion of the head 30.

The connecting bar 50 may overlap the inner plate 40 in the front-and-rear direction. Hereinafter, the case where the connecting bar 50 is arranged to pass the rear side of the inner plate 40 will be described. However, the connecting bar 50 may be arranged to pass the front side of the inner plate 40.

The first guide pin 54 inserted into the first guide groove 43 of the inner plate 40 may be formed in the connecting bar 50. The first guide pin 54 may protrude forward from the connecting bar 50.

A second guide groove 58 may be formed in the connecting bar 50. The second guide groove 58 may extend in the longitudinal direction of the connecting bar 50.

The first guide pin 54 may be located between the second guide groove 58 and the penetration groove 34 of the head 30 in the longitudinal direction of the connecting bar 50. That is, a distance between the stand 20 and the first guide pin 54 in the longitudinal direction of the connecting bar 50 may be less than a distance between the stand 20 and the second guide groove 58.

The first guide pin 54 may be located between the second guide groove 58 and a passage 52 (see FIG. 13) which will be described below in the longitudinal direction of the connecting bar 50.

A second guide pin 46 inserted into the second guide groove 58 may protrude from the inner plate 40. The second guide pin 46 may protrude backward from the inner plate 40. However, the present disclosure is not limited thereto and the second guide pin 46 may be fixed to the inside of the head 30.

At the time of pivot of the head 30, the second guide pin 46 may slide along the second guide groove 58. The second guide pin 46 may slide between the inner and outer ends of the second guide groove 58. The inner end may mean an end far from the stand 20 between both ends of the second guide groove 58 and the outer end may mean an end close to the stand 20 between both ends of the second guide groove 58.

That is, the first guide pin 54 of the connecting bar 50 may be inserted into the first guide groove 43 of the inner plate 40, and the second guide pin 46 of the inner plate 40 may be inserted into the second guide groove 58 of the connecting bar 50. The first guide groove 43 and the second guide groove 58 may extend along different trajectories.

Therefore, the head 30, to which the inner plate 40 is fixed, may be supported with respect to the connecting bar 50, and the pivot motion of the head 30 may be guided.

As shown in FIG. 6, when the head 30 is in a landscape mode, the first guide pin 54 may be located on one end of the first guide groove 43, and the second guide pin 46 may be located between both ends of the second guide groove 58.

As shown in FIG. 9, when the corners of the circumferences 32 and 33 of the head 30 face the stand 20 in a horizontal direction, the first guide pin 54 may be located between both ends of the first guide groove 43, and the second guide pin 46 may be located on the inner end of the second guide groove 58.

As shown in FIG. 10, when the head 30 is in a portrait mode, the first guide pin 54 may be located on the other end of the first guide groove 46, and the second guide pin 46 may be located on the outer end of the second guide groove 58.

Figure 11:
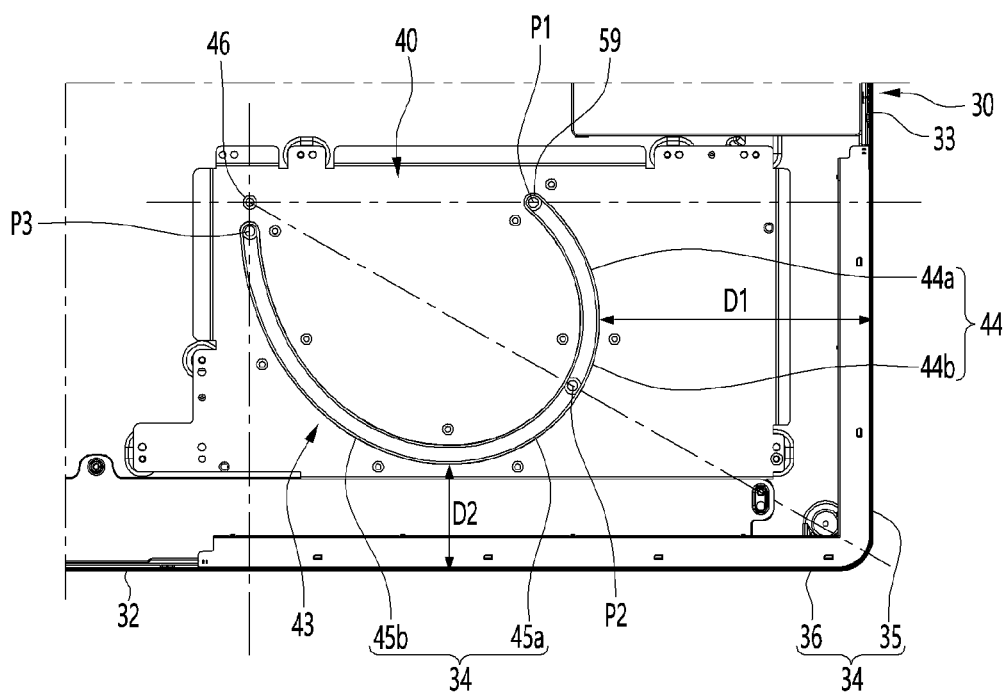
FIG. 11 is a view showing the position of a first guide pin in a first guide groove according to pivot of a head according to an embodiment of the present disclosure.

FIG. 11 is a view showing the position of a first guide pin in a first guide groove according to pivot of a head according to an embodiment of the present disclosure.

One end of the first guide groove 43 and the second guide pin 46 may be located on one line parallel with the long sides 32 of the head 30. More specifically, one end of the first guide groove 43 and the second guide pin 46 may be located on one horizontal line when the head 30 is in a landscape mode and may be located on one vertical line when the head 30 is located on one vertical line.

The other end of the first guide groove 43 and the second guide pin 46 may be located on a line parallel with the short sides of the head 30. More specifically, the other end of the first guide groove 43 and the second guide pin 46 may be located on one vertical line when the head 30 is in the landscape mode and may be located on one horizontal line when the head 30 is in the portrait mode.

Meanwhile, when the head 30 is in the landscape mode, the first guide pin 59 may be located at a first point P1 of the first guide groove 43. The first point P1 may be one end of the first guide groove 43.

When the connecting bar 50 passes between the first groove 35 and the second groove 36 of the head 30, the first guide pin 59 may be located at a second point P2 of the first guide groove 43.

When the head 30 is in a portrait mode, the first guide pin 59 may be located at a third point P3 of the first guide groove 43. The third point P3 may be the other end of the first guide groove 43.

The distance between the first guide groove 43 and the penetration groove 34 in the longitudinal direction of the connecting bar 50 may be the same when the head 30 is in a landscape mode and a portrait mode.

More specifically, the distance between the first point P1 and the first groove 35 in a direction parallel with the long sides 32 of the head 30 may be equal to the distance between the second point P2 and the second groove 36 in a direction parallel to the short sides 33 of the head 30. That is, when the head is in a landscape mode, the horizontal distance between the first point P1 and the first groove 35 may be equal to the vertical distance between the second point P1 and the second groove 36.

Accordingly, when the head 30 is in a landscape mode and a portrait mode, distances between the circumferences 32 and 33 of the head 30 and the stand 20 may be the same. Therefore, the appearance of the display apparatus may be improved.

Meanwhile, the first guide groove 43 may include a first section 44 between the first point P1 and the second point P2 and a second section 44 between the second point P2 and the third point P3. The first section 44 and the second section 45 may be continuously connected.

In the longitudinal direction of the first guide groove 43, the length of the first section 44 may be less than that of the second section 45.

The first section 44 may be formed to be curved toward the first groove 35 of the head 30. The distance D1 between the first section 44 and the first groove 35 may decrease and then increase from the first point P1 to the second point P2. The distance D1 may be a distance in a direction parallel with the long side 32 of the head 30.

More specifically, the first section 44 may include a first decreasing section 44a in which the distance D1 decreases and a second increasing section 44b in which the distance D1 increases, from the first point P1 to the second point P2 along the first guide groove 43.

The first decreasing section 44a may include the first point P1, and the first increasing section 44b may include the second point P2. The first decreasing section 44a and the first increasing section 44b may be continuously connected.

In the longitudinal direction of the first guide groove 43, the length of the first decreasing section 44a may be greater than that of the first increasing section 44b.

The second section 45 may be formed to be curved toward the second groove 36 of the head 30. The distance D2 between the second section 45 and the second groove 36 may decrease and then increase from the second point P2 to the third point P3. The distance D2 may be a distance in a direction parallel with the short side 33 of the head 30.

More specifically, the second section 45 may include a second decreasing section 45a in which the distance D2 decreases and a second increasing section 45b in which the distance D2 increases, from the second point P2 to the third point P3 along the first guide groove 43.

The second decreasing section 45a may include the second point P2 and the second increasing section 45b may include the third point P3. The second decreasing section 45a and the second increasing section 45b may be continuously connected.

In the longitudinal direction of the first guide groove 43, the length of the second decreasing section 45a may be less than that of the second increasing section 45b.

By the trajectory of the first guide groove 43, while the distances between the circumferences 32 and 33 of the head 30 and the stand 20 are minimized, the head 30 may be smoothly pivoted without interfering with the stand 20. In addition, the user may immediately tilt the head 30 without adjusting the distance between the head 30 and the stand 20. That is, the user may intuitively pivot the head 30 without horizontally or vertically moving the head.

In a comparative example, in the related art, the user pulled the head away from the stand to ensure the distance between the head and the stand before tilting the head of the display apparatus, tilted the head, and then pushed the head back toward the stand.

Figure 12:
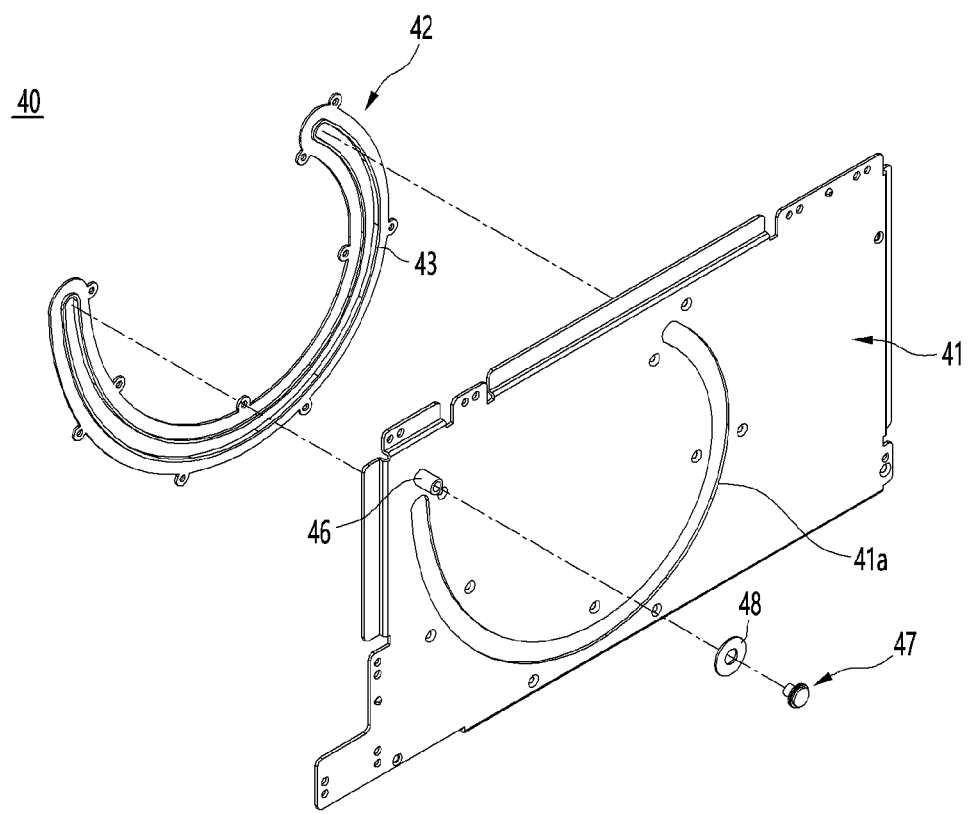
FIG. 12 is an exploded perspective view of an inner plate according to an embodiment of the present disclosure.

FIG. 12 is an exploded perspective view of an inner plate according to an embodiment of the present disclosure.

The inner plate 40 may include a plate body 41 and a first guide body 42.

The plate body 41 may have a metal material. The plate body 41 may be formed of a single metal plate or may be formed by fastening a plurality of metal plates.

A penetration portion 41a fastened with the first guide body 42 may be formed in the plate body 41. The penetration portion 41a may have a shape corresponding to that of the above-described first guide groove 43.

In addition, the above-described second guide pin 46 may protrude from the plate body 41. The second guide pin 46 may be formed integrally with the plate body 41 or may be formed independently of the plate body 41 and fastened to the plate body 41.

For example, the second guide pin 46 may be a boss 47 fastened with a fastening member 47 such as a screw, and a washer 48 may be fitted into the fastening member 47. Referring FIG. 8, the washer 48 may be located at the opposite side of the inner plate with the connecting bar 50 interposed therebetween. In addition, the washer 48 may have a size and shape not to pass through the second guide groove 58.

Accordingly, the washer 48 may prevent the second guide pin from escaping from the second guide groove 58 of the connecting bar 50.

The first guide body 42 may be fitted into the penetration portion 41a of the plate body 41, and the above-described first guide groove 43 may be formed therein. The first guide body 42 may have a ring shape corresponding to that of the first guide groove 43.

The first guide body 42 may include a non-metallic material. More specifically, the first guide body 42 may include a plastic material. More specifically, the first guide body 42 may include a polyoxymethylene (POM) material.

By the material of the first guide body 42, friction between the inner circumference of the first guide groove 43 and the outer circumference of the first guide pin 54 (see FIG. 7) may be reduced. Accordingly, as compared to the case where the first guide groove 43 is formed in the plate body 41 made of a metal material, pivot motion of the head 30 may be softly and smoothly performed.

Figure 13:
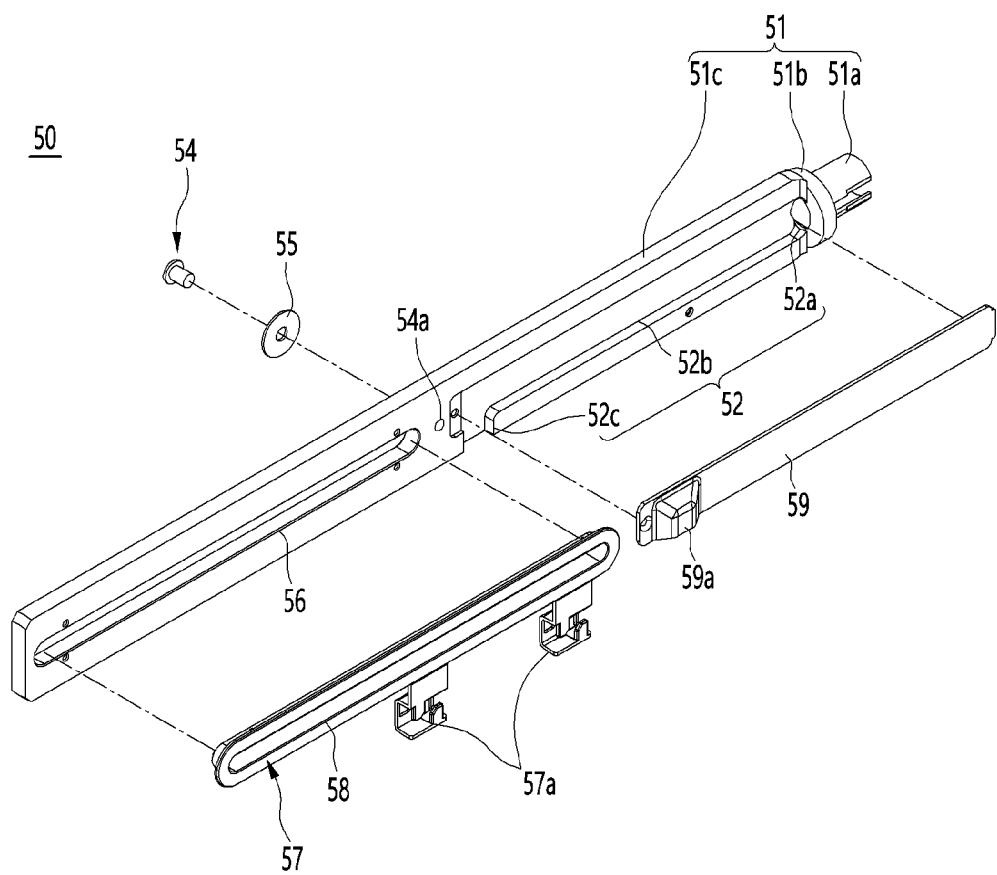
FIG. 13 is an exploded perspective view of a connecting bar according to an embodiment of the present disclosure.
Figure 14:
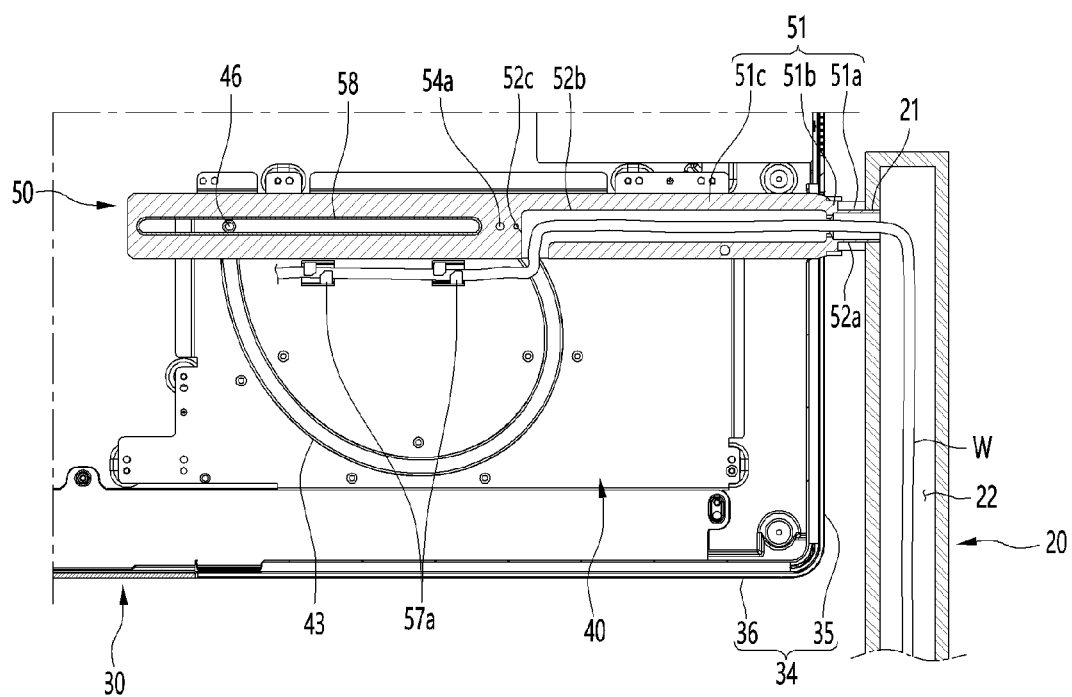
FIG. 14 is a view illustrating connection between a connecting bar and a stand according to an embodiment of the present disclosure.

FIG. 13 is an exploded perspective view of a connecting bar according to an embodiment of the present disclosure, and FIG. 14 is a view illustrating connection between a connecting bar and a stand according to an embodiment of the present disclosure.

The connecting bar 50 may include a bar body 51 and a second guide body 57.

The bar body 51 may have a metal material. The bar body 51 may be formed of a single member or may be formed by fastening a plurality of members.

The bar body 51 may include a stand connector 51a connected to the stand 20, a flange 51b extending from the stand connector 51a, and an extension 51c extending from the flange 51b.

The stand connector 51a may be rotatably connected to the stand 20. More specifically, a connection hole 21 may be formed in the stand 20 and at least a part of the stand connector 51a may be inserted into the connection hole 21.

The flange 51b may be located between the circumferences 32 and 33 of the head 30 and the stand 20. The flange 51b may be formed with a size not to pass through the penetration groove 34 of the head 30 and the connection hole 21 of the stand 20.

The extension 51c may extend to the inside of the head 30 by passing through the penetration groove 34 of the head 30. The cross section of the extension 51c may be a non-circular. For example, the cross section of the extension 51c may be approximately rectangular.

A long hole 56 fastened with the second guide body 57 may be formed in the bar body 51. More specifically, the long hole 56 may be formed in the extension 51c. The long hole 56 may have a shape corresponding to that of the second guide groove 58.

In addition, the above-described first guide pin 54 may protrude from the bar body 51. More specifically, the first guide pin 54 may protrude from the extension 51c.

The first guide pin 54 may be formed integrally with the bar body 51 or may be formed independently of the bar body 51 and fastened to the bar body 51.

For example, a fastening hole 54a fastened with the first guide pin 54 may be formed in the bar body 51, and the washer 55 may be fitted into the first guide pin 54. The first guide pin 54 may include a head portion for preventing escaping of the washer 55.

The washer 55 may be located at the opposite side of the connecting bar 50 with the inner plate 40 interposed therebetween. In addition, the washer 55 may have a size and shape not to pass through the first guide groove 43 (see FIG. 7).

Accordingly, the washer 45 may prevent the first guide pin 54 from escaping from the first guide groove 43 of the inner plate 40.

The second guide body 57 may be fitted into the long hole 56 of the bar body 51, and the above-described second guide groove 58 may be formed therein. The second guide body 57 may have a ring shape corresponding to that of the second guide groove 58.

The second guide body 57 may include a non-metallic material. More specifically, the second guide body 57 may include a plastic material. More specifically, the second guide body 57 may include a polyoxymethylene (POM) material.

By the material of the second guide body 57, friction between the inner circumference of the second guide groove 58 and the outer circumference of the second guide pin 46 (see FIG. 8) may be reduced. Accordingly, as compared to the case where the second guide groove 58 is formed in the bar body 51 made of a metal material, pivot motion of the head 30 may be softly and smoothly performed.

In addition, at least one of the first guide pin 54 or the second guide pin 46 may include a non-metallic material, more specifically, a plastic material, and more specifically, a polyoxymethylene material.

In addition, at least one of the washer 55 or 48 (see FIGS. 12 and 13) connected to each guide pin 54 or 46 may include a non-metallic material, more specifically, a plastic material, and more specifically, a polyoxymethylene material.

Therefore, pivot motion of the head 30 may be more softly and smoothly performed.

Meanwhile, a passage 54, through which an electric wire W passes, may be formed in the connecting bar 50. More specifically, the passage 52 may be formed in the bar body 51.

The electric wire W may extend from the inside of the base 10 to the inside of the head 30 through the inside of the stand 20. The electric wire W may be referred to as a wire or a cable.

For example, a battery may be disposed inside the base 10. The electric wire W may supply power stored in the battery to the plurality of electric components installed in the display 31 and the head 30.

An internal space 22, through which the electric wire W passes, may be formed in the stand 20. The internal space 22 of the stand 20 may vertically extend. That is, the stand 20 may have a pipe shape having a predetermined inner diameter.

The passage 52 formed in the connecting bar 50 may guide the electric wire W to the inside of the head 30.

More specifically, the passage 52 may include an inlet 52a penetrating through the stand connector 51a and the flange 51, and a main passage 52b and an outlet 52c formed in the extension 51c. The electric wire W may extend to the inside of the head 30 by sequentially passing through the inlet 52a, the main passage 52b and the outlet 52c.

The inlet 52a may enable communication between the internal space 22 of the stand 20 and the main passage 52b. The inlet 52a may be a cavity formed over the stand connector 51a and the flange 51b.

The main passage 52b and the outlet 52c may be located inside the head 30. The main passage 52b and the outlet 52c may be recessed in the bar body 51 and, more specifically, one surface of the extension 51c, which may mean a surface opposed to a surface facing the inner plate 40.

The main passage 52b may extend in the longitudinal direction of the connecting bar 50.

The outlet 52c may extend from the main passage 52b to the circumferential surface of the connecting bar 50. The outlet 52c may extend in a direction perpendicular to the main passage 52b.

The connecting bar 50 may further include a cover 59 covering the main passage 52b. The electric wire W may pass between the main passage 52b and the cover 59.

The cover 59 may also cover the outlet 52c.

A protrusion 59a having an internal space may be formed on the cover 59. The protrusion 59a may be formed at a position adjacent to the outlet 52c. Accordingly, the electric wire W may be smoothly bent to the outlet 52c in the internal space of the protrusion 59a.

Meanwhile, a hook 57a supporting the electric wire W exiting through the outlet 52c may be formed on the connecting bar 50. A plurality of hooks 57a spaced apart from each other in the longitudinal direction of the connecting bar 50 may be provided.

More specifically, the hook 57a may be formed on the second guide body 57. The hook 57a may be connected to the lower edge of the second guide body 57.

By the hook 57a, the electric wire may be neatly arranged in the head 30.

Figure 15:
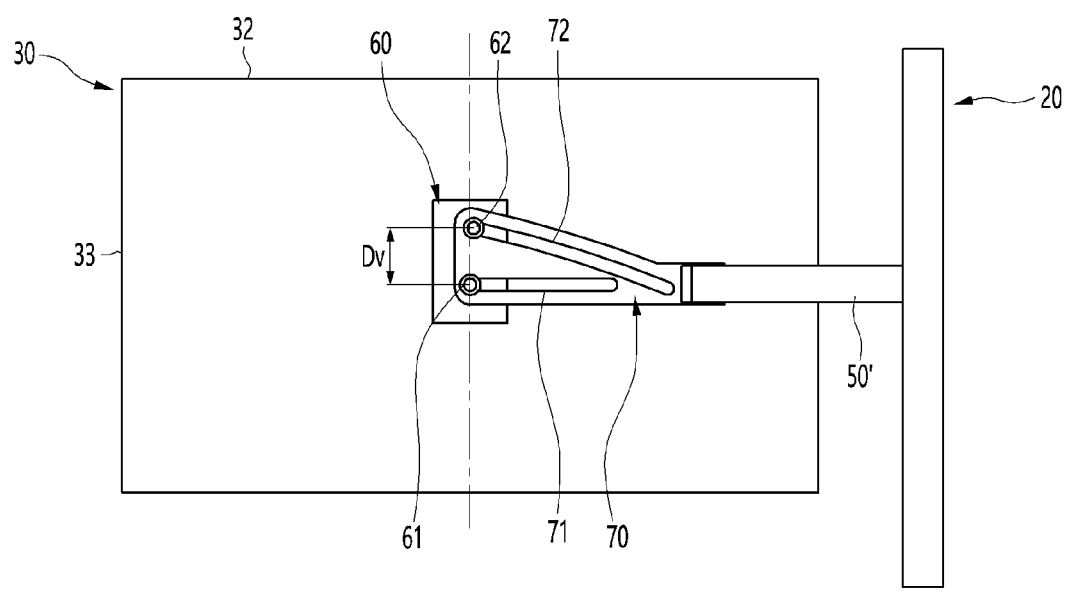
FIG. 15 is a view showing the inside of a head according to another embodiment of the present disclosure.
Figure 16:
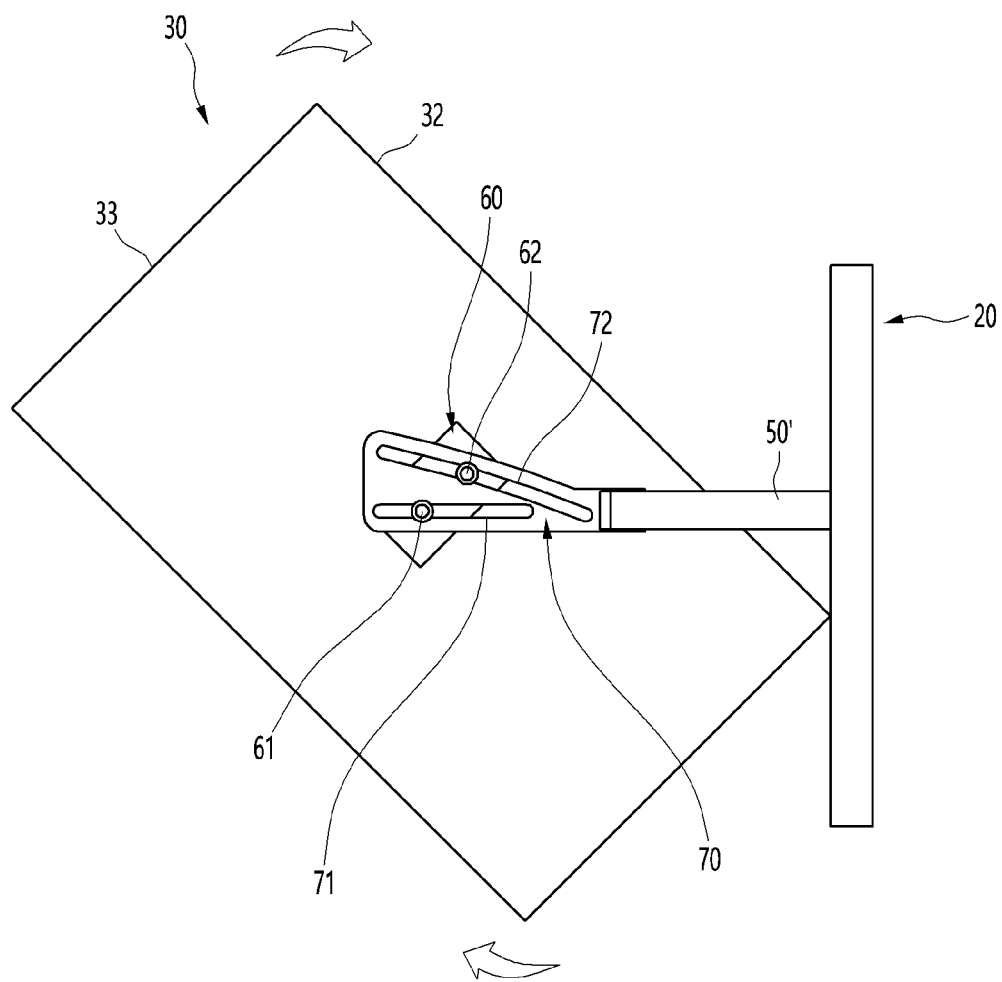
FIGS. 16 and 17 are views illustrating pivot motion of a head according to another embodiment of the present disclosure.
Figure 17:
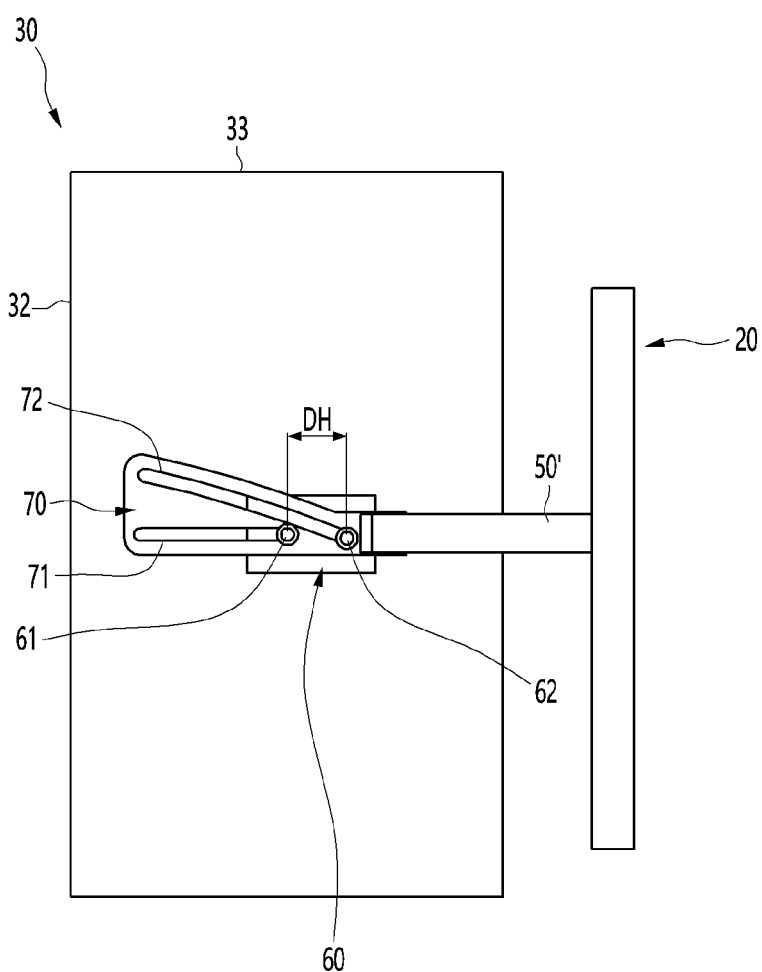

FIG. 15 is a view showing the inside of a head according to another embodiment of the present disclosure, and FIGS. 16 and 17 are views illustrating pivot motion of a head according to another embodiment of the present disclosure.

The display apparatus according to the present embodiment is equal to the above-described embodiments except for a mechanism for pivoting the head 30. Accordingly, a repeated description will be omitted and a difference will be focused upon.

The display apparatus according to the present embodiment may include an inner bracket 60 fixed to the inside of the head 30 and a bracket guide 70 fastened to an end of a connecting bar 50'.

The inner bracket 60 may be disposed on the center of the head 30.

The bracket guide 70 may overlap the inner bracket 40 back and forth. Hereinafter, the case where the bracket guide 70 is located behind the inner bracket 60 will be described for example.

A pair of guide pins 61 and 62 may protrude from the inner bracket 60. The pair of guide pins 61 and 62 may protrude backward. The pair of guide pins 61 and 62 may be spaced apart from each other. More specifically, the pair of guide pins 61 and 62 may be spaced apart in a direction (the vertical direction in FIG. 15) parallel with the short side 33 of the head 30.

A pair of guide grooves 71 and 72, into which the pair of guide pins 61 and 62 is inserted, may be formed in the bracket guide 70. The pair of guide grooves 71 and 72 may extend along different trajectories.

More specifically, the pair of guide grooves 71 and 72 may include a first guide groove 71 extending horizontally and a second guide groove 72 extending along a curved trajectory. In addition, the pair of guide pins 61 and 62 may include a first guide pin 61 inserted into the first guide groove 71 and a second guide pin 62 inserted into the second guide groove 72.

The first guide groove 71 and the second guide groove 72 may be separated from each other. The length of the first guide groove 71 may be less than that of the second guide groove 72.

The trajectory of the second guide groove 72 may be formed such that the distances between the circumferences 32 and 33 of the head 30 and the stand 20 are the same when the head 30 is in the landscape mode and the portrait mode.

At the time of pivot of the head 30, the first guide pin 61 may slide along the first guide groove 71 and the second guide pin 71 may slide along the second guide groove 72. Accordingly, the head 30, to which the inner bracket 60 is fixed, may be supported with respect to the bracket guide 70, and pivot motion of the head 30 may be guided.

The first guide pin 61 may slide between the inner and outer ends of the first guide groove 71. The second guide pin 62 may slide between the inner and outer ends of the second guide groove 72.

The inner end may mean an end far from the stand 20 between both ends of each guide groove 71 or 72 and the other end may mean an end close to the stand 20 between both ends of each guide groove 71 or 72.

The inner end of the first guide groove 71 and the inner end of the second guide groove 72 may be spaced apart in a vertical direction and may be located on the same vertical line.

The outer end of the first guide groove 71 and the outer end of the second guide groove 72 may be spaced apart in a horizontal direction and may be located on the same horizontal direction.

A vertical distance DV between the inner end of the first guide groove 71 and the inner end of the second guide groove 72 may be equal to a distance DH between the outer end of the first guide groove 71 and the outer end of the second guide groove 72.

As shown in FIG. 15, when the head 30 is in the horizontal mode, the first guide pin 61 may be located at the inner end of the first guide groove 71 and the second guide pin 62 may be located at the inner end of the second guide groove 72.

That is, when the head is in the portrait mode, the pair of guide pins 61 and 62 may be spaced apart in the vertical direction and may be located on the same vertical line.

As shown in FIG. 16, when the head 30 is being pivoted, the first guide pin 61 may be located between both ends of the first guide groove 71 and the second guide pin 62 may be located between both ends of the second guide groove 72.

As shown in FIG. 17, when the head 30 is in the portrait mode, the first guide pin 61 may be located at the outer end of the first guide groove 71 and the second guide pin 62 may be located at the outer end of the second guide groove 72.

That is, when the head 30 is in the portrait mode, the pair of guide pins 61 and 62 may be spaced apart from each other in the horizontal direction and may be located on the same horizontal line.

According to the preferable embodiment of the present disclosure, since a pair of guide pins is inserted into a pair of guide grooves extending along different trajectories to guide pivot motion of a head, and the heat may be pivoted between in a landscape mode and a portrait mode. Therefore, it is possible to determine the pivot trajectory of the head only by a simple structure.

In addition, a user can intuitively pivot the head without horizontally or vertically moving the head.

In addition, the pivot mechanism of the head is simple and thus the thickness of the head may be decreased.

In addition, since the head is supported by the pair of guide pins, the head may be stably supported without shaking.

In addition, a guide body in which each guide groove is formed has a polyoxymethylene (POM) material, the head may be softly and smoothly tilted.

In addition, the electric wire may extend from the inside of the base to the inside of the head by sequentially passing through the inside of the stand and the passage formed in the connecting bar. Therefore, since the electric wire is not exposed to the outside, the appearance of the display apparatus may be neat.

The above description is merely illustrative of the technical spirit of the present disclosure, and those of ordinary skill in the art to which the present disclosure pertains will appreciate that various modifications and variations are possible without departing from the essential characteristics of the present disclosure.

Therefore, the embodiments disclosed in the present disclosure are not intended to limit the technical spirit of the present disclosure, but are intended to describe the embodiments of the present disclosure, and the scope of the technical spirit of the present disclosure is not limited by these embodiments.

The scope of the present disclosure should be interpreted by the following claims, and all technical spirits within the equivalent range of the appended claims should be interpreted as being included in the scope of the present disclosure.

What is claimed is:

1. A display apparatus comprising:
   a base;
   a stand vertically extending upward from the base;
   a head having a display provided on a front surface thereof and pivotable between a landscape mode in which a long side of a circumference is in a horizontal state and a portrait mode in which the long side is in a vertical state;
   a penetration groove extending along the circumference of the head;
   a connecting bar connected to the stand and extending to an inside of the head through the penetration groove;
   an inner plate fixed to the inside of the head;
   a first guide groove formed in the inner plate and extending along a predetermined curved trajectory;
   a first guide pin protruding from the connecting bar and inserted into the first guide groove;
   a second guide groove formed in the connecting bar and extending in a longitudinal direction of the connecting bar; and
   a second guide pin fixed to the inside of the head or protruding from the inner plate and inserted into the second guide groove,
   wherein the penetration groove comprises:
   a first groove extending along a short side of the circumference of the head; and
   a second groove extending along a long side of the circumference of the head and connected with the first groove.

2. The display apparatus of claim 1, wherein the first guide pin is located between the second guide groove and the penetration groove in the longitudinal direction of the connecting bar.

3. The display apparatus of claim 1, wherein the connecting bar is horizontally maintained at the time of pivot of the head.

4. The display apparatus of claim 1, wherein, at the time of pivot of the head, the inner plate slides with respect to the first guide pin along a trajectory of the first guide groove, and the second guide pin slides along the second guide groove.

5. The display apparatus of claim 1, wherein a distance between the first guide groove and the penetration groove varies in a longitudinal direction of the first guide groove.

6. The display apparatus of claim 1, wherein a distance between the first guide groove and the penetration groove in the longitudinal direction of the connecting bar is the same when the head is in the landscape mode and the portrait mode.

7. The display apparatus of claim 1, wherein the first guide groove comprises:
   a first section between a first point where the first guide pin is located when the head is in the landscape mode and a second point where the first guide pin is located when the connecting bar passes between the first groove and the second groove; and
   a second section between a third point where the first guide pin is located when the head is in the portrait mode and the second point.

8. The display apparatus of claim 7,
   wherein the first section comprises a first decreasing section in which a distance from the first groove decreases and a first increasing section in which the distance from the first groove increases, from the first point to the second point, and
   wherein the second section comprises a second decreasing section in which a distance from the second groove decreases and a second increasing section in which the distance from the second groove increases, from the second point to the third point.

9. The display apparatus of claim 1, wherein the inner plate comprises:
   a plate body having a metal material and having a penetration portion formed therein; and
   a guide body fastened to the penetration portion, having the first guide groove formed therein, and having a non-metallic material.

10. The display apparatus of claim 1, wherein the connecting bar comprises:
    a bar body having a metal material and having a long hole formed therein; and
    a guide body fastened to the long hole, having the second guide groove formed therein, and having a non-metallic material.

11. The display apparatus of claim 9, wherein the guide body has a polyoxymethylene material.

12. The display apparatus of claim 11, wherein at least one of the first guide pin or the second guide pin has a polyoxymethylene material.

13. The display apparatus of claim 1, further comprising an electric wire extending from an inside of the base to the inside of the head through an inside of the stand,
    wherein a passage for guiding the electric wire to the inside of the head is formed in the connecting bar.

14. The display apparatus of claim 13, wherein the first guide pin is located between the second guide groove and the passage in the longitudinal direction of the connecting bar.

15. A display apparatus comprising:
    a base;
    a stand vertically extending upward from the base;
    a head having a display provided on a front surface thereof and pivotable between a landscape mode in which a long side of a circumference is in a horizontal state and a portrait mode in which the long side is in a vertical state;
    a penetration groove extending along the circumference of the head;
    a connecting bar connected to the stand and extending to an inside of the head through the penetration groove;
    an inner bracket fixed to the inside of the head;

a pair of guide pins protruding from the inner bracket and spaced part from each other;

a bracket guide fastened to an end of the connecting bar;

a first guide groove formed in the bracket guide and extending horizontally; and a second guide groove formed in the bracket guide and extending along a curved trajectory longer than the first guide groove, wherein one of the pair of guide pins is inserted into the first guide groove, and the other of the pair of guide pins is inserted into the second guide groove.

16. The display apparatus of claim 15, wherein the pair of guide pins is spaced apart from each other in a vertical direction when the head is in the landscape mode and is spaced apart from each other in a horizontal direction when the head is in the portrait mode.

17. The display apparatus of claim 15, wherein an inner end of the first guide groove and an inner end of the second guide groove are spaced apart in a vertical direction, and wherein an outer end of the first guide groove and an outer end of the second guide groove are spaced apart in a horizontal direction.

18. The display apparatus of claim 17, wherein a vertical distance between the inner end of the first guide groove and the inner end of the second guide groove is equal to a horizontal distance between the outer end of the first guide groove and the outer end of the second guide groove.

\* \* \* \* \*